United States Patent [19]
Doty

[11] Patent Number: 4,567,648
[45] Date of Patent: Feb. 4, 1986

[54] ROTARY ASSEMBLY MACHINE

[75] Inventor: Myron L. Doty, Greenwood, Ind.

[73] Assignee: Moorfeed Corporation, Indianapolis, Ind.

[21] Appl. No.: 574,014

[22] Filed: Jan. 26, 1984

[51] Int. Cl.[4] .................... B23P 19/00; B23P 21/00
[52] U.S. Cl. ..................................... 29/792; 29/785
[58] Field of Search ............... 29/783, 785, 786, 787, 29/789, 791, 792, 793, 795

[56] References Cited

U.S. PATENT DOCUMENTS

| | | | |
|---|---|---|---|
| 2,996,738 | 8/1961 | Wilson | 29/792 |
| 3,114,159 | 12/1963 | Yoshikawa | 29/785 |
| 3,142,078 | 7/1964 | Pipes | 29/785 |
| 3,165,927 | 1/1965 | Brosseit | 29/792 |
| 3,225,370 | 12/1965 | Pipes | 29/785 |
| 3,378,907 | 4/1968 | Dixon | 29/792 |
| 4,049,389 | 9/1977 | Grinberg | 29/792 |

FOREIGN PATENT DOCUMENTS 348327  9/1972  U.S.S.R. ................... 29/792

Primary Examiner—Mark Rosenbaum
Assistant Examiner—Steven Nichols
Attorney, Agent, or Firm—Barnes & Thornburg

[57] ABSTRACT

A rotary assembly apparatus includes a base having a pair of parallel vertically oriented axes. A pair of circular platelike members of differing diameters are mounted for rotation, one on each axis such that the peripheries of the circular platelike members encompass both axes and are in juxtaposition at one point. Each of the platelike members includes on its periphery a plurality of receivers for receiving elements of a mechanical assembly from feeders positioned adjacent the periphery of the platelike members. The rotation of the platelike members brings a set of the elements into juxtaposition and one of the receivers moves vertically with respect to the other to complete the assembly of the elements.

13 Claims, 7 Drawing Figures

ROTARY ASSEMBLY MACHINE

Assembly machines of this general class are known in which a circular horizontally oriented table or dial is rotated about a vertical axis. The circular table or dial has a series of circumferentially spaced radial openings which receive two or more elements of a mechanical assembly from vibratory feeders containing the individual parts or elements to be assembled. The circular table is indexed from station to station so that the parts may be inserted in the desired order and then advanced to an assembly station. At the assembly station, a reciprocally driven tool swages or otherwise works on the parts in order to secure the assembly of the various elements. The circular table is then advanced to a subsequent station where the assembly is ejected from the carrier by means of a blast of air or other similar means. An example of such an apparatus is to be found in Autio U.S. Pat. No. 3,162,874.

The present invention is similar to such prior art devices in that it utilizes vibratory feeders to feed the various parts or elements of the assembly to the rotary assembly apparatus. It is also similar to the prior art in that parts are fed from the vibratory feeders to circular members which are generally horizontally oriented and rotated about a vertical axis. Unlike the prior art, the circular tables of the present invention can be continuously rotated rather than indexed. This continuous rotation permits a faster assembly of the parts in question and results in less noise and wear on the apparatus itself.

An assembly apparatus of the present invention has a base which includes an axis defining means which defines a first and a second axis which generally would be parallel to each other. As previously indicated, the axes would be generally vertical but might be oriented in some other plane if the assembly so required. First and second members are mounted on the base for rotation about the first and second axis respectively. The members are generally circular and plate-like and each member has a plurality of receiving means for receiving elements of a mechanical assembly about its periphery. Means such as vibratory feeders are provided for introducing the elements of the assembly into the receiving means at fixed points of the rotation of the first and second members. An appropriate rotating means is provided for rotating first and second members to bring a set of elements into juxtaposition. The rotating means preferably continuously operates so as to enjoy the maximum advantages of the present invention but step wise operation might also be useful with certain assemblies. Means are provided for moving the receiving means of a first member toward the receiving means of a second member to join the various elements of the mechanical assembly. The movable receiving means is generally movable in a direction normal to the plane of rotation of the member to which it is mounted. The moving means preferably moves the receiving means into two discrete steps so as to first capture one element with respect to another, and thereafter to secure one element to another. The movable receiving means is then retracted and an appropriate stop or ejector is provided which permits the assembled part to fall or be plucked from the movable receiving means.

One feature of the present invention is the inclusion of a third rotary member which rotates with one of the first and second members to provide a moving anvil against which work on the mechanical assembly can be done by the moving receiving member. This permits the swaging or other necessary function in the assembly of the parts to be achieved without the use of a separate vertically reciprocal stamp or punch which, in turn, has the advantage of permitting high speed continuity of the assembly operation.

Another feature of the present operation is the differing diameters of the two circular rotating members carrying the elements of the mechanical assembly. The two members are rotated about axes separated from each other such that the elements of the assembly are brought into juxtaposition at one point during the rotation of the assembly apparatus and thereafter continuously separate as the two members rotate on their respective axes. The two elements of the assembly are joined together at or about the point of juxtaposition so that one is captured within the other, but the two are not fully assembled together. As the two rotating members continue in their separate rotational paths, one element of the mechanical assemble is separated from its carrier and, instead, is carried by the element to which it is to be mated in the final assembly. This feature again permits a smooth high speed operation by providing the continuous ejection of one of the elements of the mechanical assembly from its first carrier in a smooth transition with little or no opportunity for wear, vibration, or the like which might act to cause the two elements to become disconnected one from another.

Additional features and advantages of the invention will become apparent to those skilled in the art upon consideration of the following detailed description of a preferred embodiment exemplifying the best mode of carrying out the invention as presently preceived. The detailed description particularly refers to the accompanying figures in which the FIG. 1 is a perspective view of the assembly apparatus including two vibratory feeders;

Figure 1:
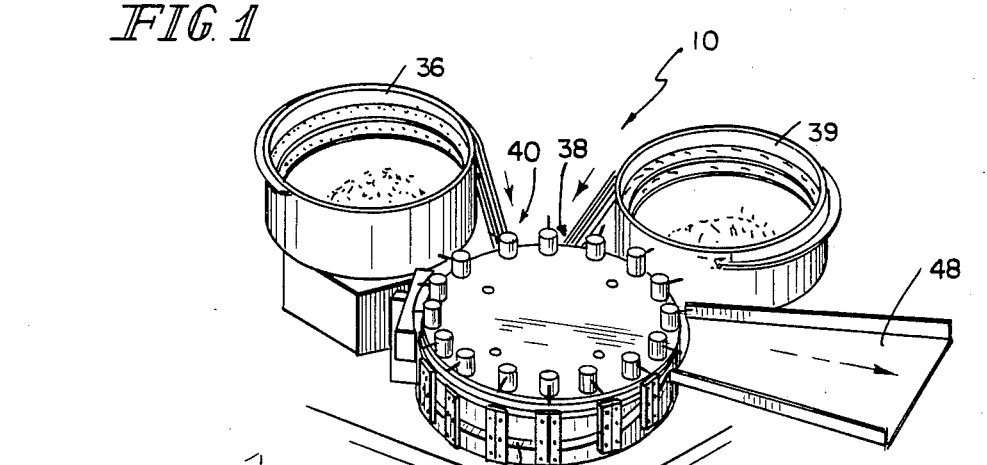
Figure 2:
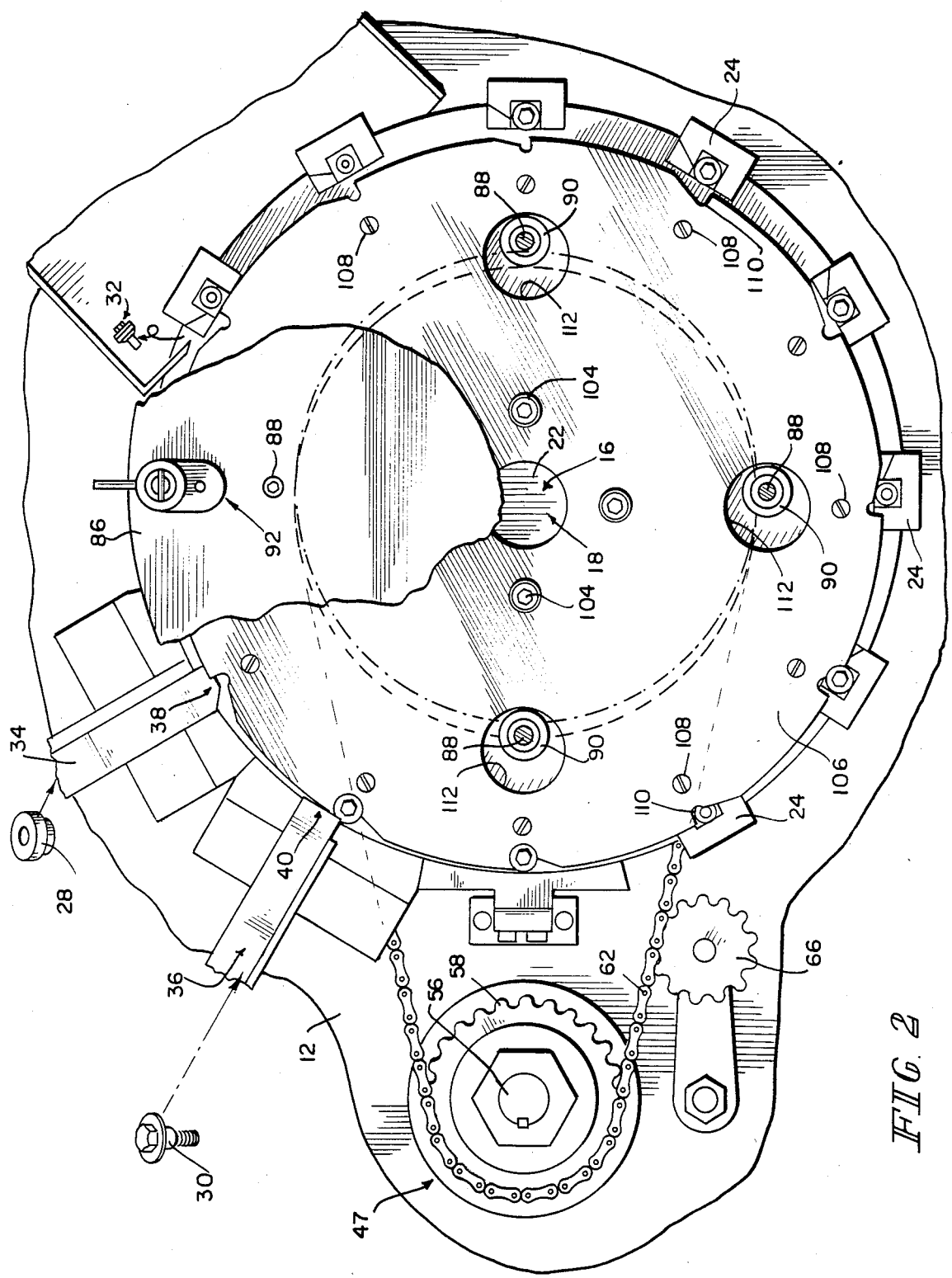
FIG. 2 is a plan view partially broken away of the apparatus shown in FIG. 1.

A rotary assembly apparatus 10 in accordance with the present invention is shown generally in the figures to have a base 12 which includes axis defining means 14 for defining a first and a second axis 16 and 18 respectfully. First member 20 and second member 22 are mounted for rotation about the first and second axis respectively. Each member 20 and 22 has receiving means 24 and 26 for receiving an element 28 or 30 of a mechanical assembly 32. Means such as vibratory feeders 34 and 36 are provided for introducing the elements 28 and 30 into the receiving means 24 and 26 at fixed points 38 and 40 of the rotation of the first and second members 20 and 22. Means 42 and 44 are provided for rotating the first and second members 20 and 22 to bring a set of the elements 28 and 30 into juxtaposition. The point of juxtaposition is illustrated to be at the 9 o'clock position in FIG. 2. Means 46, illustrated to comprise a cam track and a follower mechanism, are provided for moving the receiving means 24 of the first member 20 toward the receiving means 26 of the second member 22 to move the elements 28 and 30 from their separated position shown in FIG. 3 to a joined but as yet unassembled position shown in FIG. 6. The joined pair of elements is carried by the receiving means 24 up an assembly position. The assembly position is located at about the three o'clock position as shown in FIG. 2. At this point, the elements are sufficiently far from the second rotatable member that free vertical movement of the pair of elements is achievable. The cam track 46 acts to cause the further vertical displacement of the receiving means 24 upward to the position shown in FIG. 4 to mate the elements 28 and 30 together. The assembled articles 32 are then ejected from the apparatus 10 down shute 48 as shown in FIG. 1.

The detailed structure of the apparatus is shown most clearly in FIGS. 2-6. The base 12 is shown to include a horizontal surface which may be provided by a floor or preferably a table to which is secured the axis defining means 14 by appropriate screw fasteners 50. The axis defining means 14 is shown to comprise a tubular member having an outer surface 52 and an inner surface 54, the two surfaces being parallel but non concentric. The axis of rotation of the cylinder defining the outer surface 52 is axis 16 while the axis of rotation of the cylinder defining inner surface 54 is axis 18. The distance between the two axes may be selected in part based on dimensional considerations of the elements sought to be assembled by the assembly apparatus 10.

Figure 3:
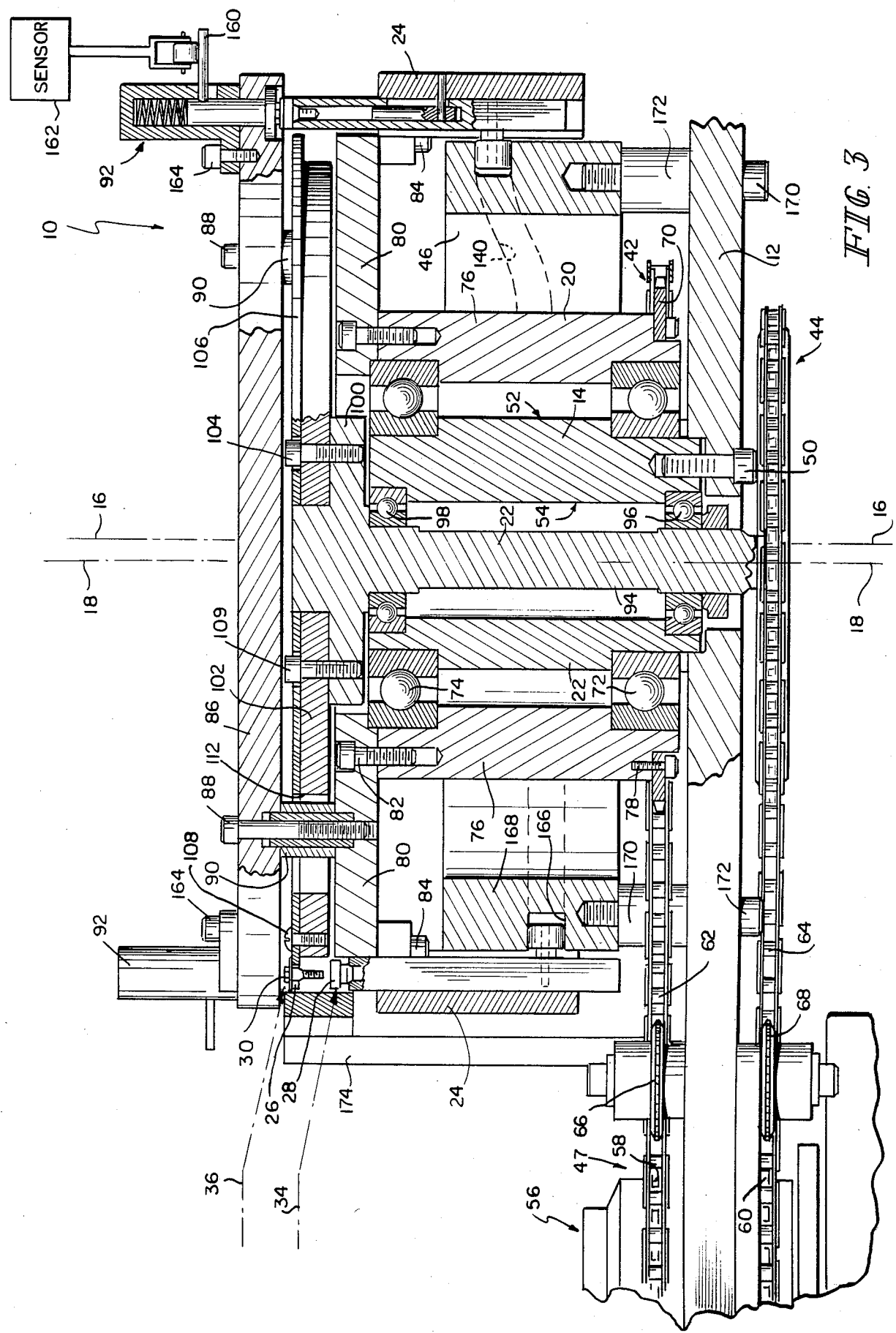
FIG. 3 is a sectional view of the apparatus taken along lines 3—3 of FIG. 2.

The base 12 is also a support for the motor means 46. The motor means 47 is shown in FIGS. 2 and 3 to generally comprise a shaft 56 driving an upper sprocket 58 and a lower sprocket 60. The sprockets 58 and 60 are generally driven at the same speed and are of the same size. The sprockets engage chains 62 and 64 respectively and pass by an idler wheel 66 and 68 which maintains the chains 62 and 64 under tension. Chain 62 engages sprocket 70 fixed to the first rotary member 20 while chain 64 engages a sprocket fixed to the second rotary member 22. The two sprockets connected to the inner ends of chains 62 and 64 are generally the same size and driven at the same speed so as to cause the first and second rotating members 20 and 22 to rotate at the same angular rate.

The first rotating member 20 is supported with respect to the axis defining means 14 by lower bearing 72 and upper bearing 74. The bearings 72 and 74 are conventional roller bearing assemblies having an inner and outer race. The inner race of each bearing 72 and 74 is fixed to the outer surface 52 of the axis defining means 14. The outer race of each bearing 72 and 74 is fixed to an inner surface of tubular member 76. Sprocket 70 is attached to the bottom of tubular member 76 by appropriate fasteners 78.

The rotatable member 20 further includes a plate-like disk 80 secured to the top of tubular member 76 by fasteners 82. A plurality of the first receiving means 24 are fixed to the outer periphery of disk 80 by fasteners 84. The details of the construction and operation of receiving means 24 will be explained below in connection with FIGS. 4-6.

The second rotatable member 22 comprises a shaft mounted for rotation on the inner surface 54 of axis rotation defining means 14 by means of roller bearings 96 and 98. The upper end of shaft 94 includes an outwardly extending flange 100 to which is secured circular disk 102 by means of fasteners 104. A second plate-like receiving member 106 is secured to the top of disk 102 by fasteners 108. The periphery of the receiving member disk 106 includes a plurality of equally spaced notches 110 which notches form the second receiving means 26 for receiving elements 30 which are illustrated to constitute screws.

A top plate 86 is secured to plate 80 by means of a plurality of fasteners 88 and standoffs 90. The top plate 86 rotates at the same speed as plate 80 about the same first axis 16. A plurality of downwardly biased anvils 92 are carried at the periphery of top disk 86. The anvils 92 are spaced about the periphery of top disk 86 so as to overlie the first receiving means 24 mounted to disk 80. The threaded fasteners 88 and standoffs 90 securing top plate 86 to rotating disk 80 of the first rotating member 20 pass through apertures 112 of disks 102 and 106 of the second rotating member 22. The outer dimension of standoffs 90 is selected so as to not contact the inner surface of aperture 112.

While anvil 92 could comprise merely a fixed surface on disk 86, it is preferred that anvil 92 include a plunger 154 downwardly biased by a spring 156 within holder 158. The presence of the completed assembly 32 in seat 132 causes the plunger to be moved upwardly against the force of the biasing spring 156. This upward movement of the plunger 154 carries with it tang 160 fixed to the plunger which can be used to activate a sensor which may be coupled to a counter and/or alarm which may be variously used to indicate the successful or unsuccessful operation of the apparatus. The anvil 92 as a whole is secured to top plate 86 by means of appropriate screw fasteners 164 or other appropriate means.

Figure 5:
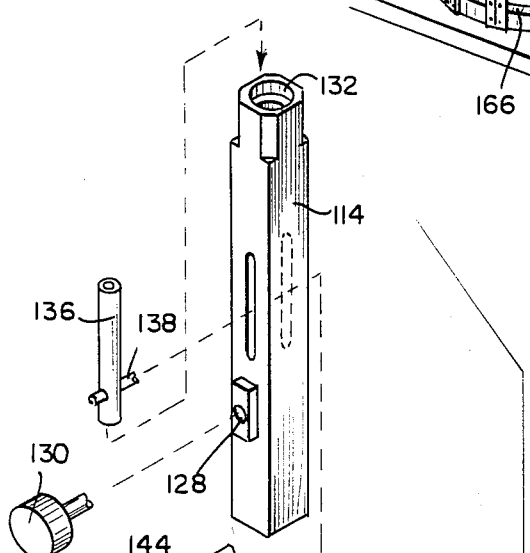
FIG. 5 is an exploded view of the first member receiving means shown in section in FIG. 4.
Figure 5:
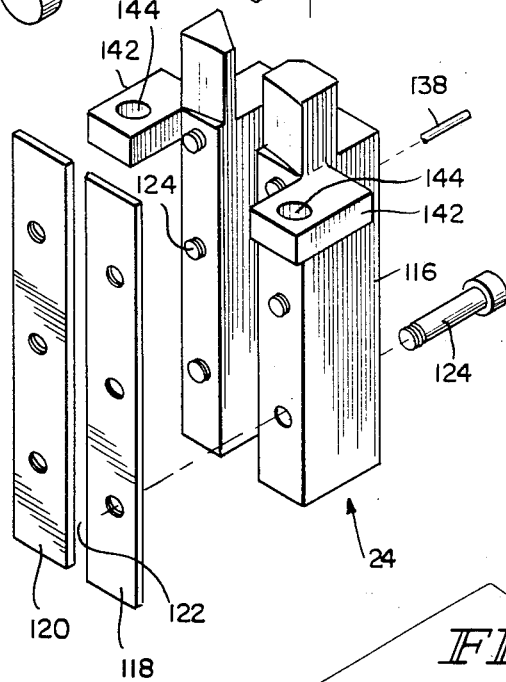
Figure 4:
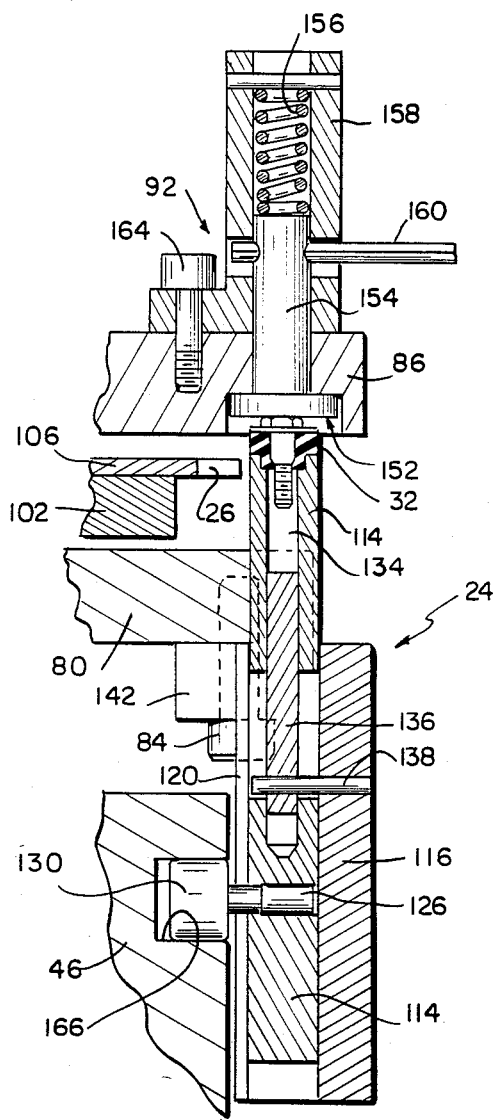
FIG. 4 is a sectional detail illustrating the joining operation of the present apparatus.
Figure 6:
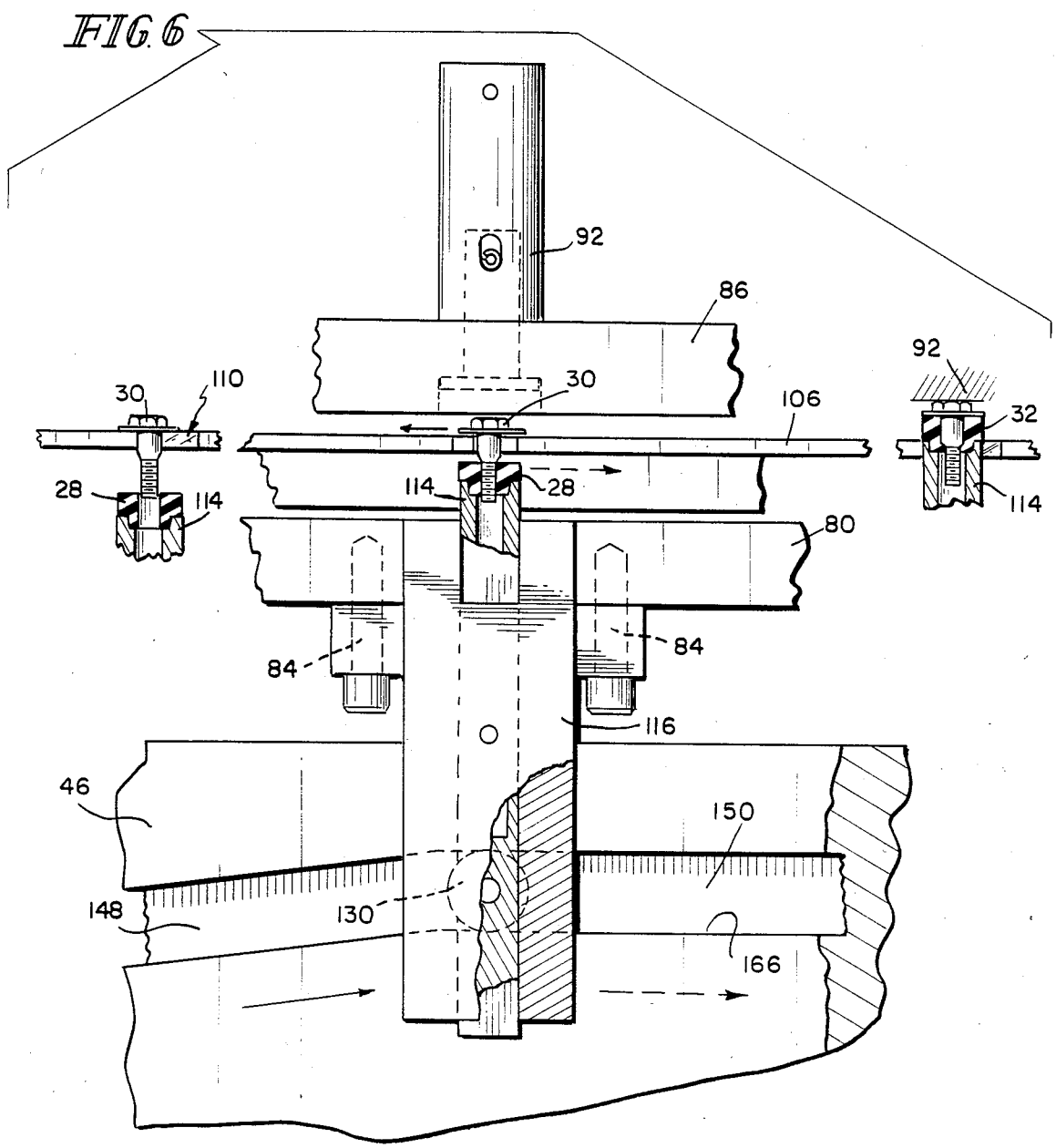
FIG. 6 is an elevation view partially broken away showing the two elements of the assembly in a captured but unassembled state.

The structure of the first receiving means 24 is illustrated in detail in FIGS. 4-6. The first receiving means includes a carrier means such as an elongated rectangular member 114 captured in a vertically oriented U-shaped linear track 116 by thin plate-like caps 118 and 120 which are separated from each other by a narrow slot 122. Appropriate fasteners 124 secure the plates 118 and 120 to the U-shaped channel 116. The rectangular channel 116 includes lateral extending flanges 142 having vertically oriented holes 144 through which extends fasteners 84 to secure the first receiving means 24 to horizontal disk 80 of first rotary member 20. The slot 122 defines a vertical track through which extends a pin 126 which is received in a hole 128 in the lower portion of elongated rectangular member 114. On the inner end of pin 126 is a roller 130 which engages a cam-track 166 of moving means 46.

Figure 7:
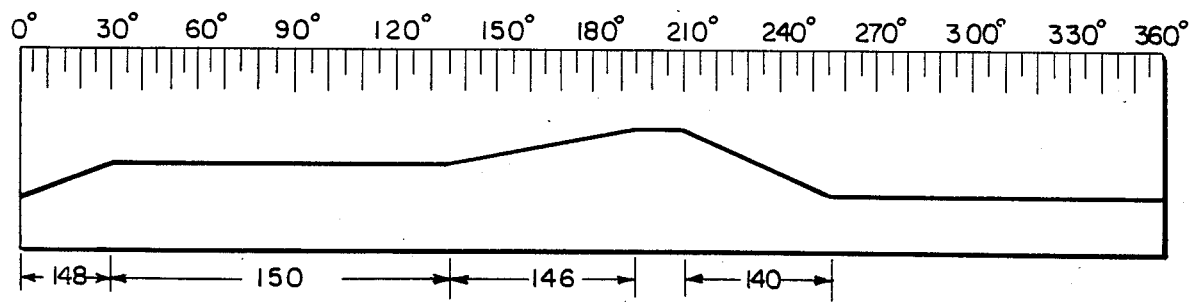
FIG. 7 is a cam chart showing the vertical position of the cam as a function of angular orientation.

The rectangular member 114 includes a cup-like depression 132 at its upper end which depression defines the seat for receiving element 28 of the mechanical assembly sought to be assembled by the apparatus 10. A circular bore 134 extends downwardly from the cup-like seat 132 and a circular pin 136 is fixed in position in the bore by key 138. The pin 136 acts as an ejector pin to forcibly eject the assembly 32 from the seat 132 as the vertically oriented rectangular slide 114 moves from the upper position shown in FIG. 4 and on the right side of FIG. 3, to a lower position shown on the left side of FIG. 3 by virtue of the downward extending portion 140 of cam track 166 shown in FIG. 3 and indicated on the cam chart in FIG. 7.

The means 46 for moving the first receiving means 24 of the first member 20 vertically comprises a cam track 166 which is provided on the exterior surface of a cylindrical element 168 which is fixed to the base 12 by means of fasteners 170 through standoffs 172. A retaining means 174 is also fixed to the base and positioned adjacent to the 9 o'clock position as shown in FIG. 2 to insure that the screw 30 and washer 28 remain radially positioned with respect to each other as the two first join as a result of the first upwardly inclined portion 148 of cam track 166.

In operation, the elements 28 and 30, which are illustrated to be a rubber washer and metal screw respectively, are fed to the assembly apparatus from rotary feeders 34 and 36. The first element, rubber washer 28, which has been previously oriented is received into the cup-like opening 132 of the receiving means 24 at a first position 38 shown in FIG. 2. The second member of the assembly, screw 30, is introduced into notches 110 of receiving means 26 at point 40, also shown in FIG. 2. Subsequent to the placement of the second element 30 in notch 110, the roller 130 following cam track 166 begins an upward rise though portion 148 shown in FIGS. 6 and 7 from the lowest portion of the cam-track to an intermediate portion 150. The circular members 80, 102, 106, and 86 all rotate in a counter-clockwise motion as shown in FIG. 2 with the end of the rise portion 148 occuring approximately 15 degrees below the 9 o'clock position shown in FIG. 2. During the intermediate dwell portion 150 of the cam, the first and second elements 28 and 30 of the assembly are joined but not secured to each other. That is, the lower portion of screw 30 is received within the opening of rubber washer 28 to such a point that the screw 30 is supported by the washer 28 and no longer requires the support of notch 110 in the disk 106 of the second receiving means 26. As the two rotatable members 20 and 22 continue to rotate in the counterclockwise position from the 9 o'clock toward the 3 o'clock position, the screw 30 is separated entirely from the notch 110 and supported entirely by washer 28.

During cam portion 146, the rectangular slide element 114 of the first receiving means 24 is urged upwardly to the point illustrated in FIG. 4 where screw 30 comes in contact with a lower surface 152 of anvil 92. The force between anvil 92 and the upwardly moving member 114 telescopes screw 30 into washer 28 to complete the assembly initiated at the 9 o'clock position.

Although the invention has been describe in detail with reference to certain preferred embodiments and specific examples, variations and modifications exist within the scope and spirit of the invention as described and as defined in the following claims.

What is claimed is:

1. A rotary assembly apparatus comprising a base including axis defining means for defining first and second axes which are vertically oriented and in a spaced apart parallel relation to each other, first and second circular plate-like members having differing diameters from each other mounted for rotation about the first and second axes respectively such that the peripheries of the first and second members encompass both axes and are in juxtaposition at one point, each member having receiving means positioned on its periphery for receiving an element of a mechanical assembly, means for introducing the elements into the receiving means at fixed points of the rotation of the first and second members, means for rotating the first and second members to bring a set of the elements into juxtaposition, and means for moving the receiving means of the first member toward the receiving means of the second member to join the elements.

2. The apparatus of claim 1 wherein said means for moving the first receiving means operates at said point of juxtaposition to achieve at least partial assembly of the elements.

3. The apparatus of claim 1 wherein the means for moving the first receiving means comprises a cam track fixed to the base and a cam follower attached to first receiving means.

4. The apparatus of claim 3 wherein the cam track includes at least two rises for providing a two-step assembly process.

5. The apparatus of claim 3 wherein the first receiving means further comprises a means for ejecting a completed assembly therefrom.

6. The apparatus of claim 1 further comprising a third member mounted for rotation with one of the first and second members for providing a moving surface against which work can be done to achieve assembly of the elements.

7. The apparatus of claim 6 wherein the third member further comprises anvil means including biased elements for completing the assembly of the elements.

8. A rotary assembly apparatus comprising a base including axis defining means for defining first and second non-coincident, parallel axes, first and second circular plate-like members having differing diameters from each other mounted for rotation about the first and second axes respectively such that the peripheries of the first and second members encompass both axes and are in juxtaposition at only one point, each member having receiving means positioned on its periphery for receiving an element of a mechanical assembly, means for rotating the first and second members to bring a set of the elements into juxtaposition, means for moving the receiving means of the first member toward the receiving means of the second member to join the elements, and means rotating with the first member providing a working element for completing the assembly of the element.

9. The apparatus of claim 8 wherein each member includes a plurality of said receiving means, the receiving means being situated at a fixed radius with respect to the axis of rotation of the member.

10. The apparatus of claim 8 wherein the means moving with the first member comprises a plate-like disk rotating about the first axis at the same speed as the first member.

11. The apparatus of claim 10 wherein the means moving with the first member further comprises a spring biased anvil assembly facing the receiving means of the first member.

12. The apparatus of claim 8 wherein the receiving means of the first member comprises a linearly elongated track fixed to the first member parallel to the first axis, and a carrier means mounted for movement in the track for carrying one of the elements of the assembly.

13. The apparatus of claim 12 wherein said means for moving the receiving means comprises a cam track fixed to said base, and a cam follower fixed to the carrier means and engaging the cam track for causing movement of the carrier means with respect to the linearly elongated track.

* * * * *

UNITED STATES PATENT AND TRADEMARK OFFICE
CERTIFICATE OF CORRECTION

PATENT NO. : 4,567,648

DATED : February 4, 1986

INVENTOR(S) : Myron L. Doty

It is certified that error appears in the above-identified patent and that said Letters Patent is hereby corrected as shown below:

Column 1, after the title, insert the following paragraph:

-- The present invention generally relates to assembly machines for assembling various elements together to form a mechanical assembly. The invention particularly relates to machines for assembling bolts or other similar fasteners with washers or other companion elements at a high rate of speed and with high reliability, the assembly process generally being one of telescoping two elements together to form the desired mechanical assembly.--

Column 2, line 20, change "assemble" to --assembly--.

Column 2, lines 54 and 55, change "respectfully" to --respectively--.

Column 5, line 44, change "describe" to --described--.

Signed and Sealed this

Twenty-sixth Day of August 1986

[SEAL]

Attest:

DONALD J. QUIGG

Attesting Officer

Commissioner of Patents and Trademarks